United States Patent [19]

Leonard et al.

[11] Patent Number: 4,875,128
[45] Date of Patent: Oct. 17, 1989

[54] DISC CARTRIDGE

[75] Inventors: Vurnen Leonard, Minneapolis; Arthur K. Kato, St. Paul, both of Minn.; Kiyoshi Ohmori, Atsugi; Keisuke Fujiwara, Hiratsuka; Yutaka Soda, Atsugi, all of Japan

[73] Assignees: Minnesota Mining and Manufacturing Company, St. Paul, Minn.; Sony Corporation, Tokyo, Japan

[21] Appl. No.: 217,440

[22] Filed: Jul. 11, 1988

[51] Int. Cl.⁴ .............................................. G11B 23/03
[52] U.S. Cl. ..................................................... 360/133

[58] Field of Search ......................................... 360/133

[56]      References Cited
      U.S. PATENT DOCUMENTS

| 4,490,764 | 12/1984 | Butz | 360/133 |
| 4,571,718 | 2/1986 | Cahill et al. | 360/133 |
| 4,799,123 | 1/1989 | Kanazawa et al. | 360/133 |
| 4,819,114 | 4/1989 | Bernitt et al. | 360/133 |

Primary Examiner—Robert S. Tupper
Attorney, Agent, or Firm—Donald M. Sell; Walter N. Kirn; David W. Anderson

[57] ABSTRACT

A disc cartridge including a shell, a disc within the shell, a disc restraint for selectively restraining the drive may be inserted to move the restraint is provided with a cover attached to the restraint for engaging the release pin, moving the restraint in response to movement of the release pin and closing the opening to prevent the entrance of contaminants into the shell.

5 Claims, 3 Drawing Sheets

DISC CARTRIDGE

BACKGROUND OF THE INVENTION

1. Field of the Invention

The present invention relates to a disc cartridge having a flat restraint which forces a disc downwardly so that the disc cannot move in the disc cartridge body when it is not in use.

2. Description of the Prior Art

A disc cartridge, in which a disc is forced toward the lower shell of a cartridge body by means of a disc restraint so as not to move in the cartridge body when it is not in use and, when the disc cartridge is loaded on a disc drive unit, the restraint is released from engagement with the disc by means of a release pin is the subject of U.S. Pat. application Ser. No. 217,439 filed July 11, 1988. Referring to FIGS. 3 to 6, this disc cartridge is described in detail. Reference number 1 refers generally to a disc cartridge. A cartridge body 2 of the disc cartridge 1 comprises an essentially square upper shell 3 made of a synthetic resin and a matching lower shell 4, also made of a synthetic resin, the periphery of which is joined to the periphery of the upper shell 3. A magnetic disc 5 is rotatably housed in a space formed between the inner surface 3a of the upper shell 3 and the inner surface 4a of the lower shell 4.

A rectangular recess 3b is formed on the inner surface 3a of the upper shell 3 at an essentially central location. A tapered surface 6 is formed in the recess 3b. A long, rectangular head-receiving opening 7a serving as a disc-exposing opening is formed in the upper shell 3.

In order to insert a turntable 30 of a disc drive unit (not shown), a center opening 8 is formed on the bottom of the lower shell 4 at the center. A long and narrow receiving opening 9 is formed in the lower shell 4 at the left, lower corner portion as viewed in FIG. 3. In addition, a head receiving opening 7b, the shape of which is the same as that of the head receiving opening 7a, is formed in the bottom of the lower shell 4 at a location corresponding to the head receiving opening 7a of the upper shell 3. These head receiving openings 7a, 7b may be opened and closed by menas of a slidable, U-shaped shutter 10. The shutter 10 is biased by means of an esentially V-shaped spring 11 so as to always close the head receiving openings 7a, 7b, so that dust or the like cannot be introduced into the interior of the cartridge body 2 through the head receiving openings 7a, 7b when the disc cartridge is not in use. Furthermore, reference openings 12 and 13 are formed on the bottom of the lower shell 4 at the left and right lower corners, respectively.

The magnetic disc 5 is a thick disc made of a polyetherimide (PEI) or the like. Recording and reproducing can be performed on both surfaces thereof by means of a magnetic head or othe like of the disc drive unit. A ring-shaped hub 14 made of a synthetic resin is inserted into a hub receiving opening 51, which is formed in the magnetic disc 5 at the center thereof, to be fixed to the magnetic disc 5 by means of screws 15, adhesive or the like. Three flat springs 16 are provided on the inner periphery of a center opening 14a of the hub 14 so as to form an essentially equilateral triangle. A shaft 30a a of the turntablel 30 is inserted between these three flat springs 16. In addition, a ring-shaped metallic plate 17 is fixed to the lower surface of the hub. The metallic plate 17 adheres to a disc-shaped magnet 32 fixed to the upper surface of the turntable 30 when the disc cartridge 1 is loaded on the turntable 30.

The upper surface 14b of the hub 14 may be engaged by or released from engagement with a restraint 18. The restraint 18 comprises an essentially F-shaped metallic plate. Ends 18a, 18b of the restraint 18 are slidable on a ring-shaped rib 4b which is provided on the inner surface 4a of the bottom of the lower shell 4. The tip of a center portion 18c of the restraint 18 is formed to be an E-shaped, the center portion of which is bent at a predetermined angle and provided with a tapered portion 19 which comes into contact with the tapered surface 6 of the upper shell 3. In addition, the lower end of the left-hand end portion 18a of the restraint 18 in FIG. 3 is rectangularly bent to form an engagement portion 20 which engages a release pin 31 inserted into the receiving opening 9 of the lower shell 4. The engagement portion 20 is integrally formed with a flat compression spring 21 serving as a biasing member for the restraint 18. The flat compression spring 21 is bent to be essentially U-shaped, the tip 21a of which is in contact with the peripheral wall 4c of the lower shell 4 so as to bias the restraint 18 toward the shutter 10.

As shown in FIG. 4, when the disc cartridge 1 is not in use, the restraint 18 is moved downwardly toward the disc 5 by the elastic force of the flat compression spring 21 of the restraint 18 and by contact between the tapered surface 6 of the upper shell 3 and the tapered portion 19, so that the hub 14 is forced downwardly by means of the center portion 18c of the restraint 18, whereby the lower surface of the magnetic disc 5 on the side of the hub receiving opening 5a is forced against the ring-shaped rib 4d of the lower shell 4 on the side of the center opening 8. As a result, the magnetic disc 5 is prevented from moving within the cartridge body 2.

When the cartridge body 2 is loade do nthe turntablel 30 of the disc drive unit, the release pin 31 of the disc drive unit engages the engagement portion 20 of the restraint 18 as shown in FIG. 6. From this state, the release pin 31 is moved in the direction of the aarrow in FIG. 6 against the elastic force of the flat compression spring 21 of the restraint 18 by means of a release pin driving mechanism (not shown). As a result, as shown in FIG. 5, the center portion 18c of the restraint 18 is moved upwardly into the recess 3b of the upper shell 3 and released from the upper surface 14b of the hub 14, so hat the force of the restraint 18 against the magnetic disc 5 is released and the hub 14 is engaged by the magnet 32 of the turntable 30.

However, since the opening 9 for receiving the release pin 31 is open, dust or the like can be introduced into the cartridge body 2.

It is, therefore, an object of the present invention to provide a disc cartridge 1 in which dust or the like cannot be introduced into the cartridge body 2 through the long and narrow receiving opening 9 receiving the release pin 31.

SUMMARY OF THE INVENTION

According to the present invention, a disc cartridge comprising a cartridge body including an upper shell and a lower shell having a long and narrow receiving opening for receiving a release pin of the disc drive unit; a disc rotatably housed in the cartridge body; and a flat disc restraint which engages the release pin inserted through the long and narrow receiving opening of the lower shell, is provided with a cover attached to the restraint which covers the long and narrow receiving opening to prevent the introduction of dust or the like into the interior of the cartridge body through the long and narrow receiving opening.

The cover may be mechanically or adhesively secured to the restraint and includes either a recess or a projecting rib for engaging the release pin.

BRIEF DESCRIPTION OF THE DRAWINGS

The novel features and advantages of the present invention will become more apparent to those skilled in the art upon consideration of the followiing detailed description which refers to the accompanying drawings wherein.

DESCRIPTION OF THE PREFERRED EMBODIMENT

Figure 5:
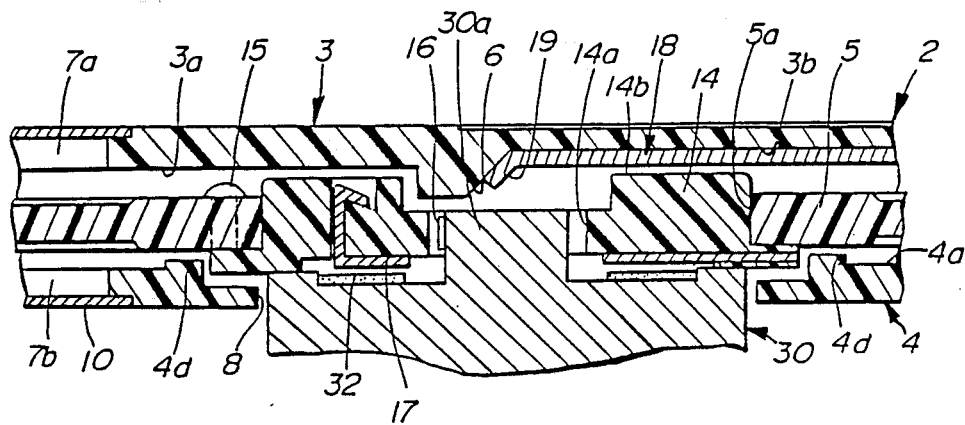
FIG. 5 is an enlarged, partial cross-sectional view corresponding to FIG. 4, in which the disc cartridge is loaded on a disc drive unit.

Referring to the drawings, the preferred embodiment of the present invention is described in detail below. The same numerals used in FIGS. 3 and 5 are used again in the descriptio of FIGS. 1 and 2 in order to provide consistency.

Figure 3:
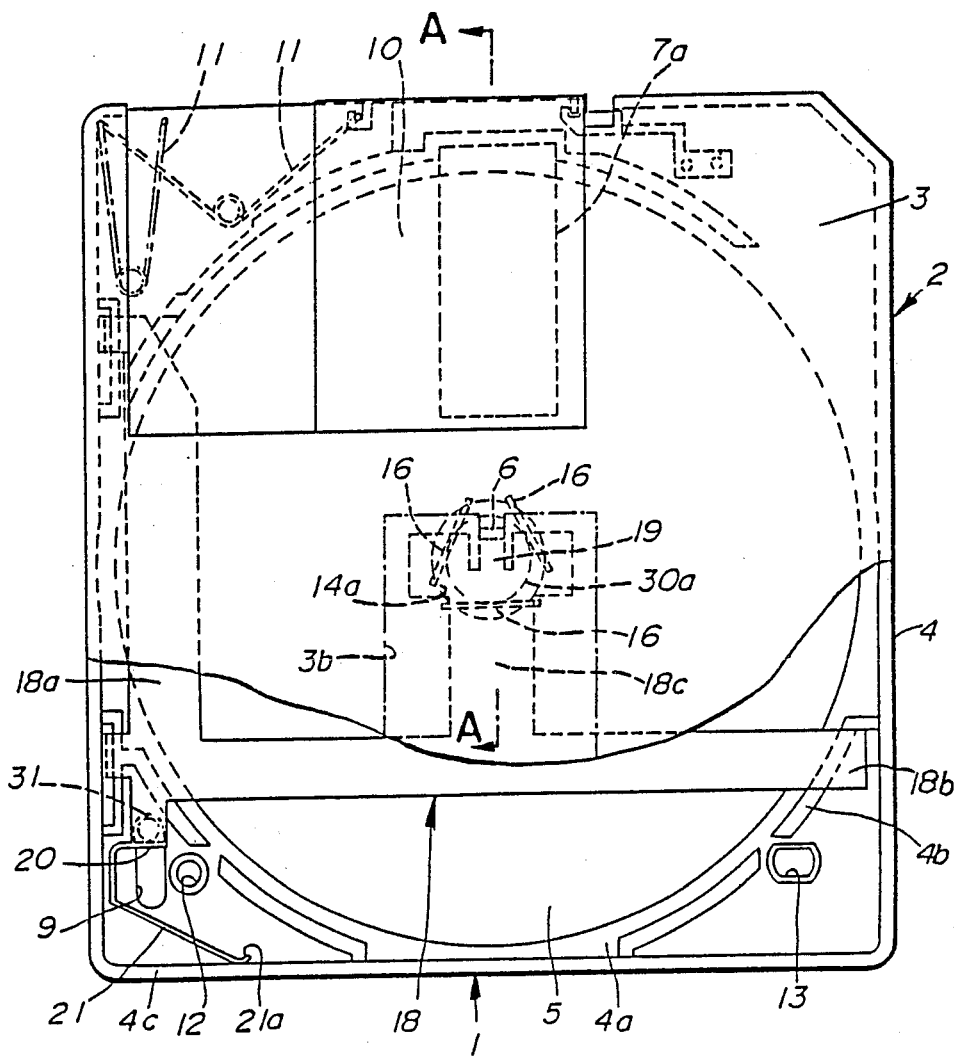
FIG. 3 is a plan view of a disc cartridge of U.S. patent application Ser. No. 217,439, with a portion broken away to show interior details.
Figure 4:
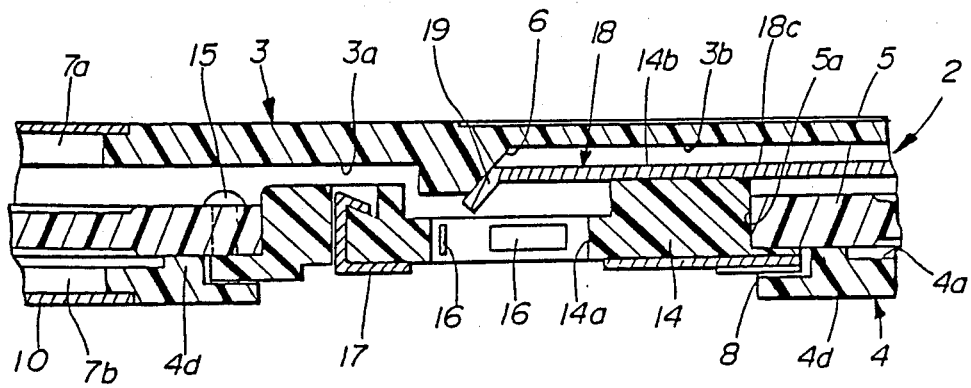
FIG. 4 is an enlarged, partial cross-sectional view taken generally along the line A—A of FIG. 3.

In FIG. 3, reference numeral 1 refers generally to a disc cartridge which comprises a carridge body 2 including an upper shell 3 in which a tapered surface 6 is formed on the inner surface 3a and a lower shell 4 in which a center portion and a long and narrow receiving opening 9 for receiving a release pin 31 is formed at one end thereof; a magnetic disc rotatably housed inthe cartridge body 2; a shutter 10 opening and closing head access openings 7a, 7b which are formed in the cartridge body 2 at the other end thereof; and a flat restraint 18 in which an engagement portion 20 is formed at one end thereof and a tapered portion 19, which comes into contact with the tapered surface 6 of the upper shell 3, is formed at the other end and which is provided between the inner surface 3a of the upper shell 3 and the magnetic disc 5 to be slideable so as to force a hub 14 of the magnetic disc 5 against the lower shell 4 by means of contact between the tapered portion 19 and the tapered suface 6. The restraint 18 is moved in the direction of the shutter 10 by a flat compression spring 21 which is integrally formed on one end of the restraint 18.

Figure 1:
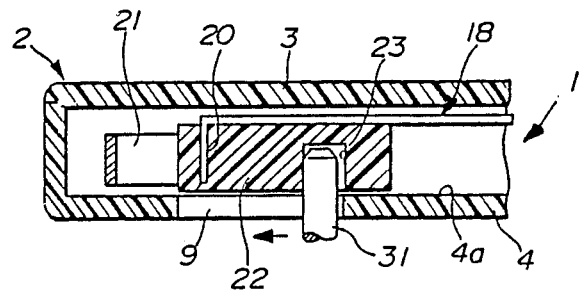
FIG. 1 is a partial cross-sectional view of aa disc cartridge according to the present invention.

With reference to FIG. 1 and according to a first embodiment of the invention, a cover 22 wider than the long and narrow receivign opening 9 of the lower shell 3 is fixed to the engagement portion 20 of the restraint 18. The cover 22 is made of a synthetic resin and is rectangular so as to cover the overall area of the long and narrow receiving opening 9. The lower surface of the cover 22 is slideable on the inner surface 4a of the lower shell 4 and is provided with a recess 23, which engages the release pin 31 when the release pin 31 is inserted.

In accordance with the aforementioned embodiment of a disc cartridge 1 of the invention, the long and narrow receiving opening 9 for receiving the release pin 31 of the lower shell 4 is completely covered by the cover 22 of the restraint 18 when the disc cartridge 1 is not inuse, and dust or the like cannot be introduced into the interior of the cartridge body 2 through the long and narrow receiving opening 9.

When this disc cartridge 1 is loaded on the disc drive unit for recording and reproducing, the releasae pin 31 of the disc drive unit engages the recess 23 of the cover portion 22. From this state, the release pin 31 is moved in the direction indicated by the arrow FIG. 1 against the elastic force of the flat compression spring 21 by means of a release pin driving mechanism (not shown), so that the center portion 18c of the restraint 18 is allowed to retract upwardly into the recess 3b so as to be released from the upper surface 14b of the hub 14. As a result, the magnetic disc 5 is released.

Figure 2:
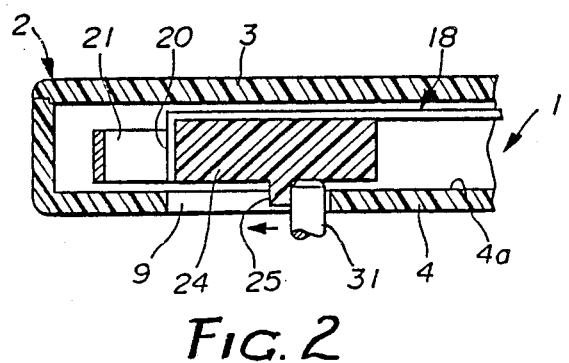
FIG. 2 is a partial cross-sectional view of an alternate embodiment of a disc cartridge according to the present invention, which corresponds to FIG. 1.
Figure 6:
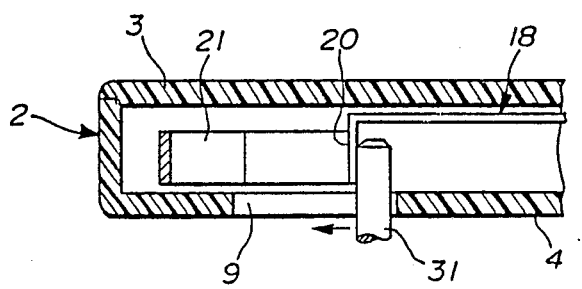
FIG. 6 is a partial cross-sectinal view of the disc cartridge of FIG. 3.

FIG. 2 shows another embodiment of the invention. In this embodiment, a cover 24 which is wider than the long and narrow receiving opening 9 of the lower shell 3 is fixed to the engagement portion 20 of the restraint 18 by means of an adhesive. The cover 24 is made of a synthetic resin and is formed to be rectangular so as to cover the overall area of the long and narrow receiving opening 9. The lower surface of he cover 24 is slideable on the inner surface 4a of the lower shell 4 and is provided with a projecting rib 25, which engages the release pin 31 when the release pin 31 is inserted, so that the same effect as that of the aforementioned embodiment is achieved.

As mentioned above, according to the present invention, since the long and narrow receiving opening 9 for receiving the release pin 31 is completely covered with the cover 22, 24, dust or the like cannot be introduced from the outside into the interior of the cartridge body 1.

We claim:

1. A disc cartridge adapted for insertion in a disc drive including a release pin, the cartridge comprising:
    a cartridge body including an upper shell and a lower shell having a long and nnarrow receiving opening for receiving said release pin of said disc drive unit;
    a disc rotatably housed in said cartridge;
    a disc restraint disposed betweenn said disc and said upper shell for restraining said disc with respect to said cartridge when said release pin is in a first position and releasing said disc for rotation within said cartridge when said release pin is in a second position; and
    a cover attached to said restraint for engaging said release pin and moving said restraint in response to movement of said release pin, said cover further closing said receiving opening to prevent the entrance of contaminants into said cartridge when said release pin is in either of said first or second positions and when said release pin is in motion between said first and said second positions.

2. A disc cartridge according to claim 1 wherein said cover is adhesively attached to said restraint.

3. A disc cartridge according to claim 2 wherein said restraint includes a downturned end and said cover is attached to said downturned end.

4. A disc cartridge according to claim 1 wherein said cover includes a recess for insertion of said release pin.

5. A disc cartridge according to claim 1 wherein said cover includes a rib extending toward said release pin for engagement with said release pin.

* * * * *

UNITED STATES PATENT AND TRADEMARK OFFICE
CERTIFICATE OF CORRECTION

PATENT NO. : 4,875,128                                  Page 1 of 2

DATED     : October 17, 1989

INVENTOR(S) : Vurnen J. Leonard, Arthur K. Kato, Kiyoshi Ohmori, Keisuke Fujiwara and Yutaka Soda It is certified that error appears in the above-identified patent and that said Letters Patent is hereby corrected as shown below:

Abstract: Second line, after "the" insert --disc and an opening through which a release pin of a disc--.

Column 1, line 57, correct "othe" to --the--.

Column 1, line 65, correct "turntable1" to --turntable--.

Column 2, line 36, correct "loade do nthe turntable1" to --loaded on the turntable--.

Column 2, line 40, correct "aarrow" to --arrow--.

Column 2, line 47, correct "hat" to --that--.

Column 3, line 14, correct "aa" to --a--.

Column 3, line 27, correct "cross-sectinal" to --cross-sectional--.

Column 3, line 34, correct "descriptio" to --description--.

UNITED STATES PATENT AND TRADEMARK OFFICE
CERTIFICATE OF CORRECTION

PATENT NO. : 4,875,128

DATED : October 17, 1989

INVENTOR(S) : Vurnen J. Leonard, Arthur K. Kato, Kiyoshi Ohmori, Keisuke Fujiwara and Yutaka Soda It is certified that error appears in the above-identified patent and that said Letters Patent is hereby corrected as shown below:

Column 3, line 37, second occurrence, correct "carridge" top --cartridge--.

Column 3, line 40, after "center" insert --opening 8 for receiving a turntable 30 is formed at the center--.

Column 3, line 60, correct "receivign" to --receiving--.

Column 4, line 6, correct "inuse" to --in use--.

Column 4, Claim 1, line 45, correct "betweenn" to --between--.

Signed and Sealed this

Twelfth Day of February, 1991

*Attest:*

HARRY F. MANBECK, JR.

*Attesting Officer*   *Commissioner of Patents and Trademarks*